United States Patent
Szijarto

(10) Patent No.: US 12,311,445 B2
(45) Date of Patent: May 27, 2025

(54) MODULAR ADDITIVE MANUFACTURING METHOD

(71) Applicant: Siemens Energy Global GmbH & Co. KG, Bayern (DE)

(72) Inventor: Janos Szijarto, Finspong (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 536 days.

(21) Appl. No.: 17/762,921

(22) PCT Filed: Apr. 1, 2020

(86) PCT No.: PCT/EP2020/059307
§ 371 (c)(1),
(2) Date: Mar. 23, 2022

(87) PCT Pub. No.: WO2021/063546
PCT Pub. Date: Apr. 8, 2021

(65) Prior Publication Data
US 2022/0347744 A1    Nov. 3, 2022

(30) Foreign Application Priority Data

Sep. 30, 2019    (EP) .................................... 19200545

(51) Int. Cl.
*B22F 5/00* (2006.01)
*B22F 10/66* (2021.01)
(Continued)

(52) U.S. Cl.
CPC .............. *B22F 5/003* (2013.01); *B22F 10/66* (2021.01); *B29C 64/40* (2017.08); *B33Y 80/00* (2014.12); *B33Y 10/00* (2014.12)

(58) Field of Classification Search
None
See application file for complete search history.

(56) References Cited

U.S. PATENT DOCUMENTS

| 2004/0031780 | A1* | 2/2004 | Hagemeister | ............. B22F 5/00 |
| | | | | 219/121.85 |
| 2012/0113439 | A1 | 5/2012 | Ederer | |

(Continued)

FOREIGN PATENT DOCUMENTS

| EP | 2666613 A1 * | 11/2013 | ............. B29C 64/40 |
| EP | 3015251 A1 | 5/2016 | |
| WO | 2018206724 A1 | 11/2018 | |

OTHER PUBLICATIONS

Machine Translation of EP-2666613-A1 (Year: 2013).*

(Continued)

*Primary Examiner* — Anthony M Liang
(74) *Attorney, Agent, or Firm* — Wolter Van Dyke Davis, PLLC

(57) ABSTRACT

A plurality of interconnected products manufactured using additive manufacturing or 3D printing, wherein at least 50% of the products of the plurality of products are connected by a breakable connection to at least one neighboring product of the plurality of products, wherein the breakable connection is adapted to be broken apart by a tool adapted to apply force on at least one side of at least two products. A method, tool, and computer program product additively manufacture the products.

16 Claims, 9 Drawing Sheets

(51) Int. Cl.
*B29C 64/40* (2017.01)
*B33Y 40/20* (2020.01)
*B33Y 80/00* (2015.01)
*B33Y 10/00* (2015.01)

(56) References Cited

U.S. PATENT DOCUMENTS

2016/0311024 A1\* 10/2016 Thiel .................. B29C 64/40
2016/0368224 A1   12/2016 Ooba et al.
2017/0050387 A1\*  2/2017 Ederer ................ B29C 64/40
2018/0029123 A1   2/2018 Gubelmann et al.
2018/0071824 A1   3/2018 Gubelmann et al.
2020/0164591 A1   5/2020 Jouard et al.

OTHER PUBLICATIONS

Zeng, Kai; "Optimization of support structures for selective laser melting"; University of Louisville; XP055574173; DOI: 10.18297/etd/2221; pp. 164-165; 2015.
PCT International Search Report and Written Opinion of International Searching Authority mailed May 27, 2020 corresponding to PCT International Application No. PCT/EP2020/059307 filed Jan. 4, 2020.

\* cited by examiner

MODULAR ADDITIVE MANUFACTURING METHOD

CROSS REFERENCE TO RELATED APPLICATIONS

This application is the US National Stage of International Application No. PCT/EP2020/059307 filed 1 Apr. 2020, and claims the benefit thereof. The International Application claims the benefit of European Application No. EP19200545 filed 30 Sep. 2019. All of the applications are incorporated by reference herein in their entirety.

FIELD OF INVENTION

The present invention refers to a plurality of interconnected products manufactured using additive manufacturing. Furthermore, the present invention refers to a product manufactured using such interconnected plurality of products. Additionally, the present invention refers to a method of manufacturing products using such interconnected plurality of products. Furthermore, the present invention refers to a tool utilized to provide the products. Additionally, the present invention refers to a computer program product to realize such method. Furthermore, the present invention refers to a device to provide such computer program product.

BACKGROUND OF INVENTION

Additive manufacturing is a very flexible method of manufacturing utilizing building up a product by adding material on an existing part or right from the scratch. In recent years the possibilities significantly improved and this new method of manufacturing products has been introduced into industrial processes. Especially, the possibility to build up structures utilizing geometries not possible using conventional methods of manufacturing significantly increases the benefit provided herewith. Methods like 3D printing, for example, utilize a metal or metal composition powder being melted layer by layer to manufacture a complex 3D structure. Despite the high flexibility provided by such method certain requirements are still to be considered. For example, the time lost during production especially when taking parts out of the manufacturing chamber. This is surprisingly getting more and more important as the technology develops. Taking into account future requirements and corresponding evaluations and tests the task to simplify and speed up the process for technical fields like continuous flow engines will be subject to a significant demand of improvement. For example, it was noted that the structures get more and more complex containing very fine details possibly resulting in metal powder being taken out of a 3D printing device and contaminating the surroundings. Therefore, it is to be expected that the required time for taking each produced part out of the manufacturing device like an 3D printing device will increase to ensure that remains of the manufacturing material is not contaminating the surroundings. Also, it is to be expected that there is a demand to produce the higher quantity of smaller parts in a single product step, wherein the post processing should be as fast as possible.

These problems are solved by the products and methods as disclosed hereafter and in the claims. Further beneficial embodiments are disclosed in the dependent claims and the further description. These benefits can be used to adapt the corresponding solution to specific needs or to solve further problems.

SUMMARY OF INVENTION

According to one aspect the present invention refers to a plurality of products manufactured using additive manufacturing, preferably 3D printing, wherein at least 50%, more preferred at least 75%, even more preferred at least 95%, of the products of the plurality of products are connected by a breakable connection to at least one neighboring product of the plurality of products, wherein the breakable connection is adapted to be broken apart by a tool adapted to apply force on at least one side of at least two products. The breakable connection typically contains, preferably consists, of the at least one bridging element extending between such neighboring products. As disclosed hereafter these bridging elements can be adapted in certain ways to optimize the breakable connection for specific applications. Such breakable connection is characterized by being weak enough to be broken apart by hand or using a mechanical tool, wherein such breaking is limited to the breakable connection. For example, such breakable connection can provide the necking area directing and controlling the breaking behavior of the connection and preventing that, for example, cracks extend into the product.

The plurality of products as disclosed above allows to easily detach the single products from each other by simply breaking them apart. It was surprisingly noted that this can easily be applied to typical fields utilized in additive manufacturing, especially surprising to metals and metal alloys utilized to provide high resistant products like being used for continuous flow engines. Also, it was noted that contrary to the prior expectations such plurality of products and the products obtained herewith even still containing the remains of the breakable connection can be efficiently utilized in even advanced technical fields providing very high requirements for corresponding products to fulfill. Very surprisingly it was noted that corresponding breakable connections can be placed accordingly to not disturb the later use or can even be beneficially utilized to increase the grip on such products simplifying later handling and insertion into corresponding devices.

Additionally, it was noted that the skilled person can easily tailor the breaking behavior according to the requirements. This allows to even manually easily and reliably detach corresponding products by simply applying force onto at least one surface of at least two products. For example, a special tool can be provided for this purpose specifically adapted to engage corresponding parts of two products. This allows to easily apply a controlled force onto the surfaces to break the breakable connection apart, while a damage of the products is prevented. In fact, it was noted that this allows to detach single products in a matter of seconds being significantly faster than common detachment methods like grinding away some connecting element between such products.

Furthermore, the present invention renders it possible to significantly simplify the transport of corresponding components to, for example, a production site. Herein, the plurality of products is packaged as a whole and broken apart at the site as required. Surprisingly, the additional possibility to effectively prevent a mix-up of different small parts like clamps with other small parts required for the corresponding steps was very well received by field personal.

According to a further aspect the present invention refers to a product manufactured by being detached from the inventive plurality of products.

According to a further aspect the present invention refers to a method of manufacturing simultaneously an inventive plurality of products, wherein the method contains the steps of a) optionally redesigning at least one product to be adapted to allow stacking of the plurality of products, b) providing manufacturing instructions, wherein a breakable connection is provided between at least a part of the plurality of products, c) manufacturing an inventive plurality of products using additive manufacturing, preferably 3D printing.

In addition to the benefits described above it was noted that a further benefit is obtained for manufacturing methods like additive manufacturing. Surprisingly, it was noted that the inventive method enables to simplify the quality assurance. In fact, the quality of the plurality of products is surprisingly far more homogenous allowing to reduce the number of required quality tests without losing reliability and enabling to still secure the quality standards. It is assumed that this results from the connections of the products to each other stabilizing the overall structure and preventing problems like especially observed during 3D printing.

According to a further aspect the present invention refers to a tool adapted to manually detach the products of an inventive plurality of products by applying force on at least one side of at least two products.

According to a further aspect the present invention refers to a computer program product, tangibly embodied in a machine-readable storage medium, including instructions operable to cause a computing entity to execute an inventive method.

According to a further aspect the present invention refers to a storage device for providing an inventive computer program product, wherein the device stores the computer program product and/or provides the computer program product for further use.

According to a further aspect the present invention refers to a kit consisting of an inventive plurality of products and an inventive tool.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

Figure 1:
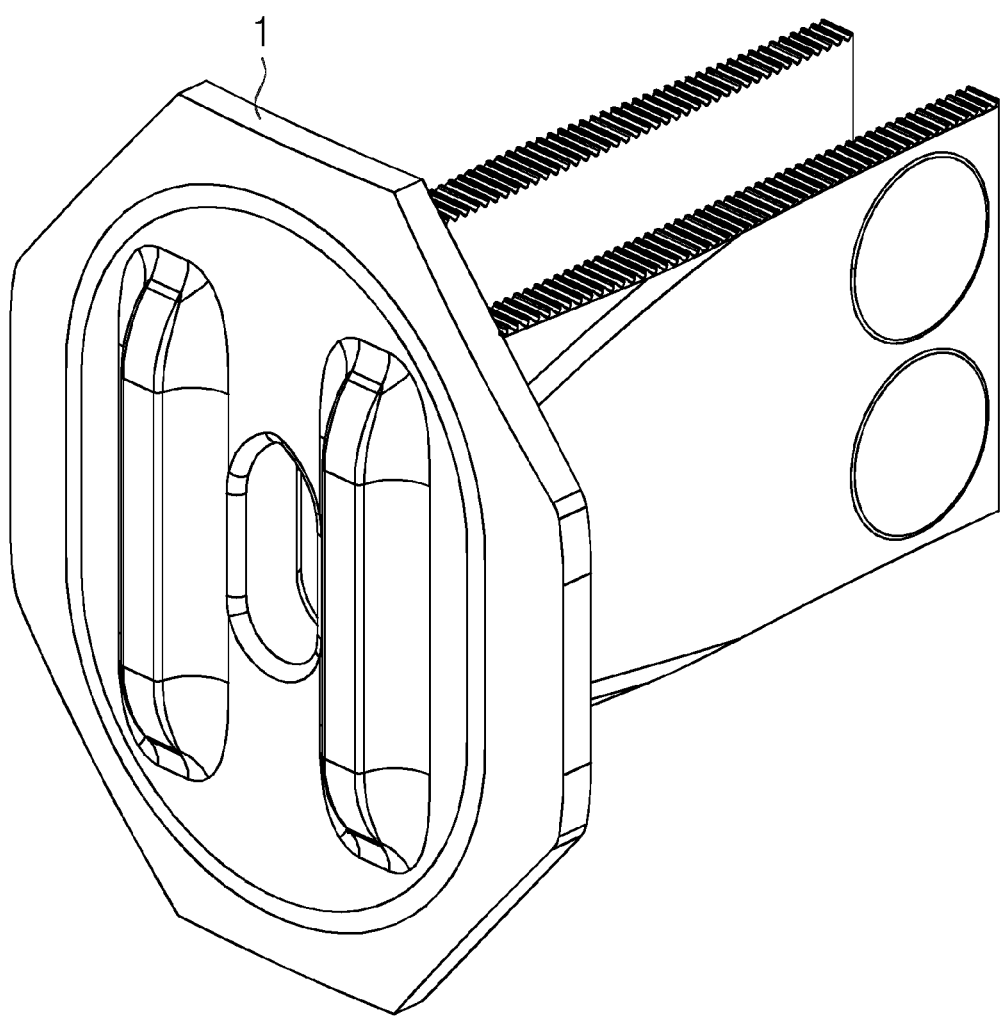
FIG. 1 shows a schematic drawing of an inventive clamp optimized to be printed in the form of an inventive plurality of products.

According to one aspect the present invention refers to a supported plurality of product as specified above.

While it is possible to also include a part of the plurality of products being connected by non breakable connections the benefit obtained renders it beneficial to include as many breakable connections as possible. According to further embodiments it is preferred that at least 60%, more preferred at least 80%, even more preferred at least 90%, of the connections of neighboring products are breakable connections. Typically, it is preferred that all connections of neighboring products are breakable connections.

Additive manufacturing methods are well established despite being relatively new. Especially additive manufacturing methods like 3D printing became topic for industrial applications in the past years and show a big potential to complement or replace existing conventional methods of manufacturing. The additive manufacturing methods are characterized by that a material is applied without some limiting element like some casting mold to build up the product. Examples of especially useful additive manufacturing methods are selective laser melting, electron beam melting and binder jetting. Such methods either build up a product utilizing a powder that typically is removed in a later step like it is done for binder jetting. Very useful for the current application are 3D printing additive manufacturing methods like selective laser melting and electron beam melting building up the product from a powder, wherein the powder is melted layer by layer. By repeating this melting process for each layer of the product the 3-dimensional element is provided.

To provide desired products a number of additive manufacturing methods have been established. Examples are selective laser melting (SLM) or electron beam melting (EBM). Herein, it has been noted that the inventive design is especially usefully applied to metallic products. According to further embodiments it is preferred that the supported product has been manufactured using a metal powder or metal composition powder like a metal alloy powder. Herein, corresponding manufacturing methods allow to easily realize the inventive design and simultaneously benefit greatly from it.

For typical embodiments it was noted that it is beneficial to include breakable connections containing no homogeneous thickness. According to further embodiments it is preferred that the breakable connection to at least one neighboring product of at least 30%, more preferred at least 60%, even more preferred at least 90%, of the products contains at least one bridging element, wherein the at least one bridging element extends between at least two neighboring products, wherein the bridging element provides a necking area between the neighboring products. Typically, it is preferred that all products provide at least one of such breakable connection to at least one neighboring product.

This allows to very simply tailor the breaking behavior as desired. Especially, in case the feedback is received that during manual detachment the force required is too strong including such necking area or making an existing necking area thinner allows to directly decrease the force required for detachment.

Surprisingly, it was noted that the inventive manufacturing method and the plurality of products produced herewith can be applied to highly resistant materials. According to further embodiments it is preferred that at least 90 weight percent (wt.-%), more preferred at least 95 wt.-%, even more preferred at least 99 wt.-%, of the products consist of a metal, metal alloy or ceramic. Typically, it is preferred that the products consist of a metal, a metal alloy or a ceramic. Although, it should be expected that corresponding materials might be difficult to be detached manually, it was noted that realizing the inventive embodiments as disclosed herein allow to easily detach the corresponding product. Herein, even highly resistant materials as utilized for continuous flow engines, like utilized in or near the hot gas path, like titanium and nickel superalloys can be processed that way. Such application is very beneficial and surprising, as it overcomes the major challenges of providing corresponding small parts for this technical area. Especially applying it to materials that might pose a danger for the health if, for example, inhaled like nickel superalloys is very beneficial. Otherwise corresponding connecting elements between such product have to be removed, for example, by grinding off such connecting elements setting free fine particles that might be inhaled.

It was noted that the provision of the arrangement of the products can be simplified by using simple reoccurring arrangements. According to further embodiments it is preferred that the products are at least partially provided as a row within the plurality of products. Typically, it is preferred that at least 50%, more preferred at least 80%, of the products are arranged in form of such rows. Within such row the products do not have to lined up one after the other, but can be, for example, arranged in an alternating arrangement, wherein the next product might be rotated by, for example, 30°, 45°, 90°, 120°, or 180°. Also, they might be additionally or alternatively be placed like a mirror image of the neighboring product. It was noted, that such simple generic instructions allow to provide the very efficient arrangement of the inventive plurality of products even using very low computing power making it highly attractive to be utilized in existing systems. Preferably, such row contains at least four, more preferred at least seven, even more preferred at least 12 products.

Furthermore, it was noted that the inventive plurality of products can be provided in a certain arrangement being especially advantageous for typical applications. According to further embodiments it is preferred that the plurality of products is provided in the form of rows of products, wherein the rows of the products are connected to provide a layer of products. Such arrangement allows to make best use of the space available, for example, in 3D printing devices. Also, it allows to easily take the complete plurality of products out of the manufacturing chamber and further process it. Providing such arrangement further enables to automate the powder removal step in such application case, as such layer can be easily taken out of the position by some robot arm and be transferred to, for example, a powder removal station.

A significant benefit of the inventive design is the possibility to provide a very material efficient design. According to further embodiments it is preferred that at least two, more preferred at least five, even more preferred at least ten, of the products provide at least one breakable connection directly extending between neighboring products. Herein, such breakable connection directly extending between neighboring products is typically designed to break apart essentially in the middle between the neighboring products like within the area after the first 20% and before the last 20%, more preferred within the area after the first 30% and before the last 30%, even more preferred within the area after the first 40% and before the last 40%, of the breakable connection, based on the distance between the neighboring products measured in a straight connection line through the breakable connection. Such design allows to significantly reduce the material required for manufacturing as the breakable connection can be downsized to be as short as possible.

Furthermore, it was noted that for typical embodiments it is beneficial to specify limits for the length utilized for the breakable connection. According to further embodiments it is preferred that the breakable connections of at least three neighboring products provide a length of at most 12 mm, even more preferred at most 9 mm, even more preferred at most 8 mm, measured along a straight line connecting the neighboring products, wherein the straight line at least partially extends through the breakable connection. Typically, it is preferred that the aforementioned applies to the breakable connections of at least five, more preferred at least ten, neighboring products.

According to further embodiments it is preferred that the breakable connections of at least three neighboring products provide a length of at least 1 mm, more preferred at least 2 mm, measured along a straight line connecting the neighboring products, wherein the straight line at least partially extends through the breakable connection.

It is further possible to define a relative thickness of the bridging element to be beneficially applied in typical applications. According to further embodiments it is preferred that the breakable connection to at least one neighboring product of at least 30%, more preferred at least 60%, even more preferred at least 90%, of the products contains at least one bridging element, wherein the bridging element provides a maximum thickness and a minimum thickness in a cross-section perpendicular to a centerline extending through the at least one bridging element between the neighboring products, wherein the minimum thickness is at most 45%, more preferred at most 35%, even more preferred at most 27%, of the maximum thickness.

It is typically beneficial for many applications to provide the breakable connections between such rows as well as between the products within such row. However, it is typically preferred that the breakable connection between the rows differs from the breakable connection between the product within such row. For example, it can be very beneficial to provide the weak breakable connection between the rows. It can even be preferred that the connection between the rows is weak enough to be broken off by hand. Typically, it is preferred that no special tool is required to detach the rows from each other. For example, the connection between two rows can be limited to at most 10%, more preferred at most 5%, even more preferred at most 1%, of the surface of the rows facing each other.

A specific design to arrange a multitude of products being beneficial for big variety of shapes utilizes, for example, a row arrangement. According to further embodiments it is preferred that at least 70%, more preferred at least 80%, even more preferred at least 90%, of the products provide bridging elements to at most four neighboring products. This, for example, allows to provide a very efficient arrangement. Simultaneously, it is quite easy to provide corresponding tools utilized for detachment.

For specific applications it can even be beneficial to provide a specific linear arrangement. According to further embodiments it is preferred that at least 70%, more preferred at least 80%, even more preferred at least 90%, of the products provide bridging elements to at most two neighboring products. Typically, it is preferred that all product provide such bridging elements. It was noted that such design is very easy to apply to a multitude of possible shapes of products without much effort. While it is typically beneficial to apply more sophisticated designs for products to be manufactured on a regular basis, such simplified design can easily be applied by less experienced skilled persons or be automatically realized by a computer with low computing power.

For typical applications an upper limit regarding such necking area can be provided to, for example, simplify the automation of tools suggesting corresponding designs for additive manufacturing devices. According to further embodiments it is preferred that the breakable connection to at least one neighboring product of at least 30%, more preferred at least 60%, even more preferred at least 90%, of the products contains at least one bridging element, wherein the at least one bridging element provides an area in a cross-section perpendicular to a center line extending through the at least one bridging element between the neighboring products, wherein the area in a necking area is at most 50%, more preferred at most 30%, even more preferred at most 23%, of the highest area of the bridging element. Typically, it is preferred that all products provide at least one of such breakable connection to at least one neighboring product. Such design can be easily realized also using low computing power and provides significant benefits enabling detaching such product also manually.

Furthermore, it was noted to be beneficial for typical applications to provide an absolute upper limit. According to further embodiments it is preferred that the breakable connection to at least one neighboring product of at least 30%, more preferred at least 60%, even more preferred at least 90%, of the products contains at least one bridging element, wherein the bridging element provides a maximum thickness measured perpendicular to a center line extending through the at least one bridging element between the neighboring products, wherein the maximum thickness is at most 0.5 mm, more preferred at most 0.4 mm, even more preferred at most 0.3 mm. Typically, it is preferred that all products provide at least one of such breakable connection to at least one neighboring product. It was noted, that thicker bridging elements typically provide less benefits and increased difficulty to provide the reliable and suitable design.

Furthermore, it was noted that it is typically beneficial for many applications to define an upper limit of the thickness of the bridging element at the location of the necking area. According to further embodiments it is preferred that the breakable connection to at least one neighboring product of at least 30%, more preferred at least 60%, even more preferred at least 90%, of the products contains at least one bridging element, wherein the bridging element provides a minimum thickness measured perpendicular to a center line extending through the at least one bridging element between the neighboring products, wherein the maximum thickness at the location of the necking area is at most 0.2 mm, more preferred at most 0.17 mm, even more preferred at most 0.15 mm. Typically, it is preferred that all products provide at least one of such breakable connection to at least one neighboring product. Such upper limit typically provides a highly reliable possibility to manually detach the corresponding products for typical materials like metals, metal alloys and ceramics.

It is further possible to define a relative thickness of the bridging element to be beneficially applied in typical applications. According to further embodiments it is preferred that the breakable connection to at least one neighboring product of at least 30%, more preferred at least 60%, even more preferred at least 90%, of the products contains at least one bridging element, wherein the bridging element provides a maximum thickness and a minimum thickness in a cross-section perpendicular to a centerline extending through the at least one bridging element between the neighboring products, wherein the minimum thickness is at most 45%, more preferred at most 35%, even more preferred at most 27%, of the maximum thickness. Typically, it is preferred that all products provide at least one of such breakable connection to at least one neighboring product. Additionally, it was noted that for many applications it is beneficial that said minimum thickness applies to at least 40%, more preferred at least 60%, even more preferred at most 75%, of the length of the at least one bridging element, based on the length along the centerline. It should be possible to utilize a necking area located at a single point of the bridging element. However, it was noted that it is typically beneficial not to rely on such strictly limited spot. For example, it was noted that minor failures resulting from a reduced printing quality at the location of the bridging element might significantly increase the force required to detach a product. Providing the above referenced relative thickness for the specified length typically secures the needed detachment for many cases.

Testing the types of bridging elements further led to a conclusion with regard to separated bridging elements. Such bridging elements are, for example, especially useful for connecting rows of products to the product layer. According to further embodiments it is preferred that the breakable connection to at least one neighboring product of at least 10%, more preferred at least 30%, even more preferred at least 70%, of the products contains at least three, more preferred at least five, bridging elements.

Instead of separated bridging elements it is also possible to provide the breakable connection in the form of a wall like structure. According to further embodiments the breakable connection to at least one neighboring product of at least 30%, more preferred at least 70%, even more preferred at least 90%, of the products contains a wall like structure. Typically, it is even preferred that all products provide at least one breakable connection to at least one neighboring product providing such wall like structure. It was noted that corresponding breakable connections can still be easily modified with regard to the breaking behavior. Furthermore, corresponding breakable connections provide a good distribution of the stress and force applied during manufacturing as well as handling like taking it out of a manufacturing device like an additive manufacturing device.

For typical applications it was further noted to be beneficial to adapt the strength of the wall like structure by indentations. According to further embodiments it is preferred that the breakable connection to at least one neighboring product of at least 30%, more preferred at least 70%, even more preferred at least 90%, of the products provides a wall like structure containing at least one indentation on at least one side, more preferred on both sides. Typically, it is even preferred that 100% of the products provide at least one breakable connection to at least one neighboring product providing such wall like structure.

A further possibility to tailor the breaking behavior that might be combined with such indentation or might be utilized alternatively is the provision of holes. According to further embodiments it is preferred that the wall like structure contains at least one hole, more preferred at least five holes, even more preferred at least 10 holes, extending from one side of the wall to the other side of the wall. It was noted that this is an especially easy possibility to adapt the force required for breaking off the product by simply increasing the number or size of holes or altering the shape of holes. Holes in such wall like structure a used herein can have any shape available to the skilled person. Such hole can be circular, elliptical, rectangular like square shaped, polygonal, asymmetrical, and so on. Also, it can maintain such shape while extending through the wall like structure or can change its shape or diameter.

In this context, it was noted that providing the minimum number of distributed holes can be beneficial for the typical applications. According to further embodiments it is preferred that the wall like structure contains at least N holes, wherein $$N = \frac{L}{2.3 \cdot H},$$

more preferred $$N = \frac{L}{2.1 \cdot H},$$

even more preferred $$N = \frac{L}{1.8 \cdot H},$$

wherein L is the average length of the wall like structure and H is the average height of the wall like structure. Unless specified otherwise such average value represents the arithmetic mean of said value. For typical embodiments it is preferred that the holes provide an average size in a cross-section along the wall like structure being at least $0.2 \cdot H^2$, more preferred at least $0.23 \cdot H^2$, even more preferred at least $0.27 \cdot H^2$. Distributing such number of holes over the length of the wall structure typically provides a very smooth breaking behavior of the breakable connection.

Furthermore, it was noted that it is typically preferred to distribute corresponding holes in specific way. According to further embodiments it is preferred that the wall like structure provides a distance D of at most $2 \cdot H$, more preferred at most $1.6 \cdot H$, even more preferred at most $1.1 \cdot H$, between two neighboring holes over at least 90%, more preferred at least 93%, even more preferred 96%, of the length of the wall like structure. For typical embodiments it is preferred that the holes provide an average size in a cross-section along the wall like structure being at least $0.2 \cdot H^2$, more preferred at least $0.23 \cdot H^2$, even more preferred at least $0.27 \cdot H^2$. Although, it should be expected that localizing the holes at a specific location simplifies the creation of a starting point resulting in a crack growing through the wall like structure, it was noted that typically such distribution provides the better overall results for typical applications.

Also, it was noted that for pluralities of products manufactured using 3D printing it is typically beneficial to include a certain ratio related to the distance. According to further embodiments it is preferred that at least 90%, more preferred at least 94%, even more preferred 98%, of the wall like structure provides a distance D of at most $1.4 \cdot \sqrt{1.2 \cdot S}$, more preferred at most $1.3\sqrt{1.2 \cdot S}$, even more preferred at most $1.1 \sqrt{1.2 \cdot S}$, wherein S is the average size of each hole in a cross section along the wall like structure, wherein the percentage of the wall like structure is calculated based on the length along the wall like structure, wherein within the corresponding area of the wall like structure two holes are provided that fulfill this requirement. For the sake of completeness, it is to be understood that said holes do not have to be adjacent holes. For example, a very small hole not fulfilling the requirement might be located between two holes fulfilling the requirement still resulting in said area to be included in the calculation of the overall area fulfilling said requirement. Such requirement and be utilized as single design feature or combined with the design features as specified above to further adapt and improve the design according to the specific needs.

Utilizing the inventive plurality of products it is possible to simultaneously manufacture multiple products at the same time. According to further embodiments it is preferred that the number of products is at least 10, more preferred at least 40, even more preferred at least 100. Herein, it was noted that the invention can be especially beneficially applied to greater number of products. Taking into account the possibility to detach the products in a very easy fashion it is possible to mass manufacture very tiny and complex products in such way.

A specific benefit obtained using the invention is the possibility to further decrease the required volume by arranging the products accordingly. According to further embodiments it is preferred that the products are arranged in a stacked arrangement as plurality of products. Surprisingly, it is possible to easily detach also products being closely arranged next to each other.

A possibility provided by the invention to be beneficially utilized for typical embodiments is the possibility of stacking. According to further embodiments it is preferred that the products are arranged within the plurality of products so that at least a part of the plurality of products intrude into openings of neighboring products of the plurality of products. As the plurality of products allows to simply detach the products by breaking them off it is not required anymore to gain access to the corresponding connection to, for example, grind off a corresponding connection to detach the product. Thus, it is possible to provide an arrangement with hidden connections not been accessible by tools that are simply broken apart. This allows to significantly reduce the space required and optimize the design especially for a larger number of products.

Although, it is possible to combine different products and connect them by breakable connections, it is typically preferred that the same product is simultaneously manufactured multiple times. According to further embodiments it is preferred that the plurality of products contains at least 10, more preferred at least 20, even more preferred at least 40, identical products. Naturally, it is possible to provide complex manufacturing instructions and simulate the manufacturing process to flexibly arrange a multitude of different products in an inventive arrangement. However, it was noted that the computing power to address all requirements and secure the quality required is and will be a significant challenge for the near future using available equipment.

Thus, reducing the corresponding requirements and concentrating on an optimized arrangement of such identical parts was noted to be beneficial for typical applications.

According to a further aspect the present invention refers to a product manufactured by being detached from the inventive plurality of products. Based on the detachment such product provides remains of the breakable connection. While it is possible to post process such product to remove such remains it was noted that for typical application the remains do not provide a problem and the post processing step can be avoided. Taking this into account when preparing the manufacturing instructions in many cases even allows to provide the remains at a location that results in an improved grip based on such remains improving the handling in a later application.

According to further aspect the present invention refers to a method of manufacturing simultaneously an inventive plurality of products, wherein the method contains the steps of a) optionally redesigning at least one product to be adapted to allow stacking of the plurality of products, b) providing manufacturing instructions, wherein a breakable connection is provided between at least a part of the plurality of products, c) manufacturing the plurality of products using additive manufacturing, preferably 3D printing.

According to further embodiments it is preferred that the method contains the step of d) detaching the product from each other using a tool, wherein force is applied on at least one side of at least two products. Especially providing a special tool for the corresponding plurality of products allows to, for example, easily detach a product as required.

Herein, it was noted that especially utilizing a specialized tool allows to easily detach it by hand. According to further embodiments it is preferred that the detachment of step d) is done manually. Not only allows this to flexibly detach the products, but it was surprisingly noted that this is especially beneficial for the intended purpose of mass manufacturing small parts in small quantity using additive manufacturing, especially 3D printing.

According to a further aspect the present invention refers to a tool adapted to manually detach the products of an inventive plurality of products by applying force on at least one side of at least two products.

According to further embodiments it is preferred that the tool provides a handle, wherein pressing the handle applies the force to detach the products. It was noted that, for example, for very small products such tool can be beneficially utilized. The force utilizing such tool is typically quite small, however, corresponding tools have been noticed to be very easy and safe to use.

A further possibility to realize a tool utilizes the multiple part structure of the tool. According to further embodiments it is preferred that the tool contains a first part and a second part utilized to detach a product in a detachment step, wherein the second part is adapted to fixate a part of the plurality of products not to be detached in the detachment step, wherein the first part is adapted to apply force on at least one side of a product to be detached, wherein the second part is adapted to apply a counter force on at least one side of at least one different product neighboring the product to be detached.

Typically, it is preferred for typical applications to provide such tool in the form of multiple parts, wherein at least two parts are connected by a joint. According to further embodiments it is preferred that the first part and second part provide a joint, wherein the tool is adapted so that applying the force to detach a product result in a relative movement of the first part in relation to the second part besides the joint. This allows to provide a relative movement of the first part relation to the second part. It was noted that such type of movement allows to apply a bigger amount of force in a secure way still maintaining the control during that the attachment process.

Additionally or alternatively such multicomponent tool can be beneficially utilized to increase the stability of the remaining part of the plurality of products not to be detached. According to further embodiments it is preferred that the second part is adapted to fixate a part of a layer of products of the plurality of products that are not to be detached during a detachment step, wherein the first part is adapted to provide a relative movement in relation to the second part to detach the product to be detached from remaining products of the plurality of products. It was noted that such tool is especially useful for an optimized breakable connection only providing minimum resistance against breaking. Utilizing such tool ensures that no breaking is occurring at the incorrect position and a controlled detachment is achieved.

Furthermore, it was noted that it is typically beneficial to also utilize the additive manufacturing for providing the inventive tools. According to further embodiments it is preferred that at least the part contacting the product to be detached, preferably at least 50 wt.-%, even more preferred at least 80 wt.-%, even more preferred at least 99 wt.-%, of the tool, has been manufactured using additive manufacturing. This allows to specifically tailor the tool to the product significantly decreasing the problem observed during detachment. For example, it was noted that using normal pliers or fixating the plurality of products while detaching products using a metal rod easily leads to a damage of the products. However, utilizing specifically adapted tools avoids such problem. Also, it is surprisingly simple to prepare the manufacturing instructions for a corresponding part of a universal detachment tool or the complete detachment tool during the preparation of the manufacturing instructions for the plurality of products. Herein, it is even possible to directly print such tool for detachment along with the plurality of products.

According to further embodiments the part of the tool contacting the product to be detached comprises, preferably consists, of the same material as the plurality of products. Utilizing the same material surprisingly significantly decreases the possibility of damages observed on the products. It is assumed that the similar properties of the material reduces the danger of damages resulting from, for example, contacting material providing a significantly different hardness.

According to a further aspect the present invention refers to a computer program product, preferably tangibly embodied in a machine-readable storage medium, including instructions operable to cause a computing entity to execute an inventive method.

Surprisingly, it was noted that it is possible to automatically provide the parts of the tools or the complete tool to be utilized for detachment utilizing such computer program product using additive manufacturing. This allows to further reduce the amount of effort required and secures that the correct tool is available when required. Herein, such tool can be manufactured separately from the plurality of products or it can be manufactured alongside the plurality of products. For example, one layer of a plurality of products can be amended to leave out a required number of products to gain enough space to, for example, print the corresponding tool or part of the tool besides the remaining part of the layer of the plurality of products.

According to further embodiments it is preferred that the computer program product provides a selection of breakable connections. It was surprisingly noted that generic breakable connections as specified herein can be collected and easily adapted to be utilized for a broad variety of products. This allows to provide a modular system to easily provide the additive manufacturing instructions to be, for example, directly utilized in a 3D printing device minimizing the required effort by a skilled person. Especially, it is possible to completely automate fitting together the products to provide the plurality of products being no ordinary task for such skilled person. Thus, it is surprisingly possible for a person skilled in the art to provide corresponding manufacturing instructions without any prior knowledge about how to arrange the products in the inventive way to directly realize the invention as described herein.

Furthermore, an aspect of the present invention refers to a storage device for providing an inventive computer program product, wherein the device stores the computer program product and/or provides the computer program product for further use.

According to a further aspect the present invention refers to a kit consisting of an inventive plurality of products and an inventive tool.

The present invention was only described in further detail for explanatory purposes. However, the invention is not to be understood being limited to these embodiments as they represent embodiments providing benefits to solve specific problems or fulfilling specific needs. Herein, the specific embodiments disclosed above can be utilized separately or, preferably, the features of multiple embodiments are combined. The scope of the protection should be understood to be only limited by the claims attached.

FIG. 1 shows a schematic drawing of an inventive clamp optimized to be printed in the form of an inventive plurality of products. The clamp being an example of the inventive products 1 provides a head part and two flanks extending from said head part. It was manufactured using additive manufacturing. Herein, the manufacturing instructions utilized to control a 3D printing device to manufacture the clamp have been provided by utilizing an inventive computer program product. The computer program product processed the construction data of a conventional clamp and automatically adapted it to provide a design of the clamp to be suitable to be utilized for the inventive plurality of products.

Figure 2:
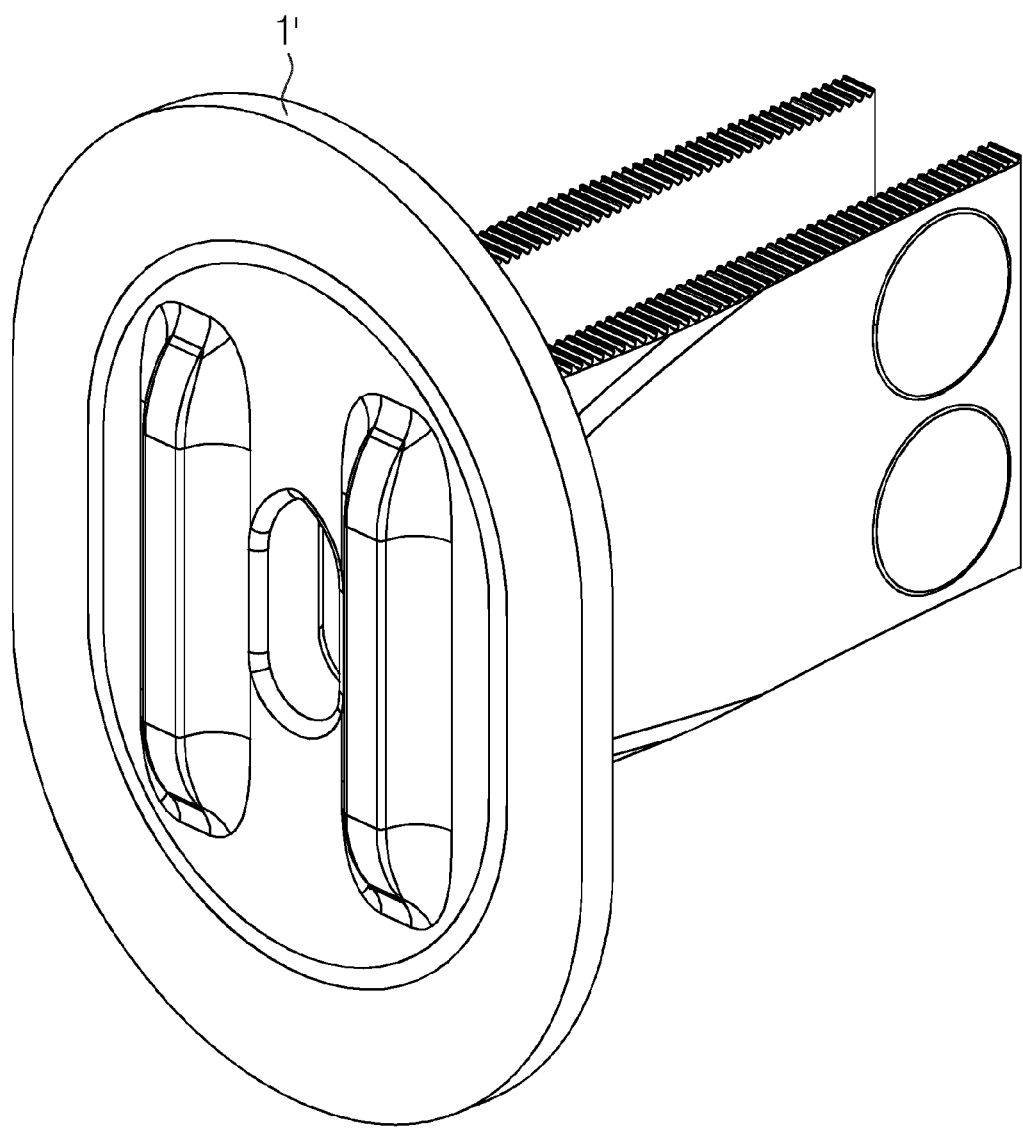
FIG. 2 shows a schematic drawing of a conventional clamp as used in continuous flow engines.

FIG. 2 shows a schematic drawing of a conventional clamp 30 as used in continuous flow engines. This clamp 1' representing a conventional product 30 also provides a head and two flanks extending from it as shown for the inventive clamp of FIG. 1. Apparently different also with this level of magnification and resolution is the design of the head part. Contrary to the conventional design as being used the sides of the flanks show some uneven surface in analogy to the remains of the breakable connection of the inventive clamp of FIG. 1. The handling was improved comparable to the inventive clamp of FIG. 1. However, the effort to provide such fine structural elements was significant using conventional means while they naturally result from the inventive design.

Figure 3:
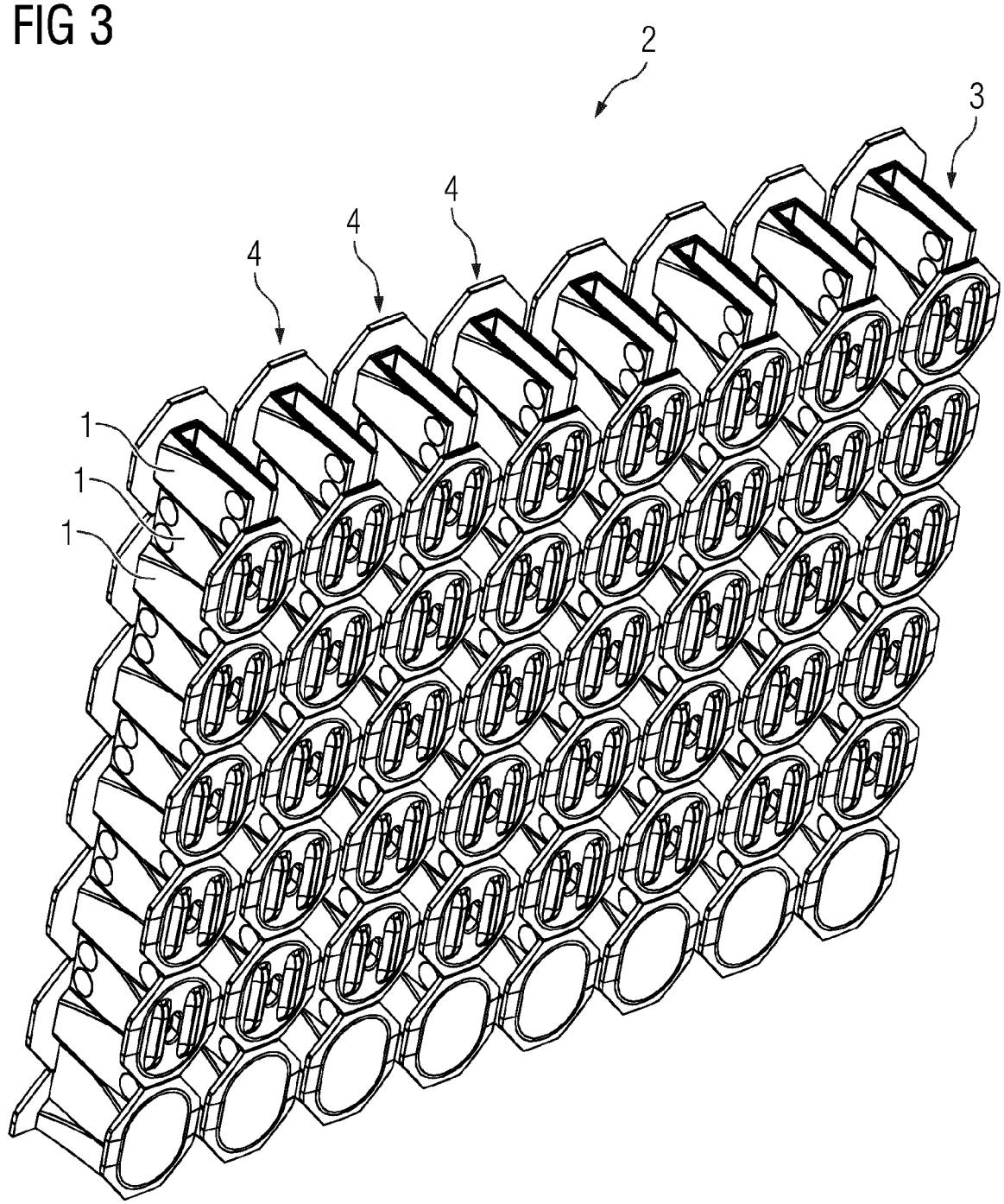
FIG. 3 shows a schematic drawing of layer-wise arranged plurality of the product as shown in FIG. 2.

FIG. 3 shows a schematic drawing of a layer-wise arranged plurality of the products 1 as shown in FIG. 2. The plurality of products 2 has been manufactured using 3D printing, wherein the 96 identical clamps have been manufactured simultaneously. Herein, a powder bed of a nickel superalloy powder has been melted layer-wise to provide the inventive 3D structure. The products 1 are connected to each other by means of breakable connections not clearly visible at this level of magnification. The breakable connections are adapted to be broken apart by a tool applying force on at least one side of at least two products 1.

The plurality of products 2 is organized in a certain way. The products 1 are arranged as rows 4. Said rows 4 are attached to each other providing the layer 3 representing the plurality of products 2. The breakable connections are realized in different forms for these different subunits. The breakable connection between the products 1 forming the rows 4 are realized as wall like structure. Said wall like structures contain holes to decrease the stability and rendering the connection breakable by using a low amount of force. On the other hand the rows 4 are connected to each other by means of single bridging elements containing a necking area. This provides a very low stability of the connection between the rows 4. The layers 3 of the plurality of products 2 can be taken out of the 3D printing device without a problem, but it is also possible to easily break apart the rows 4 by hand.

Figure 4:
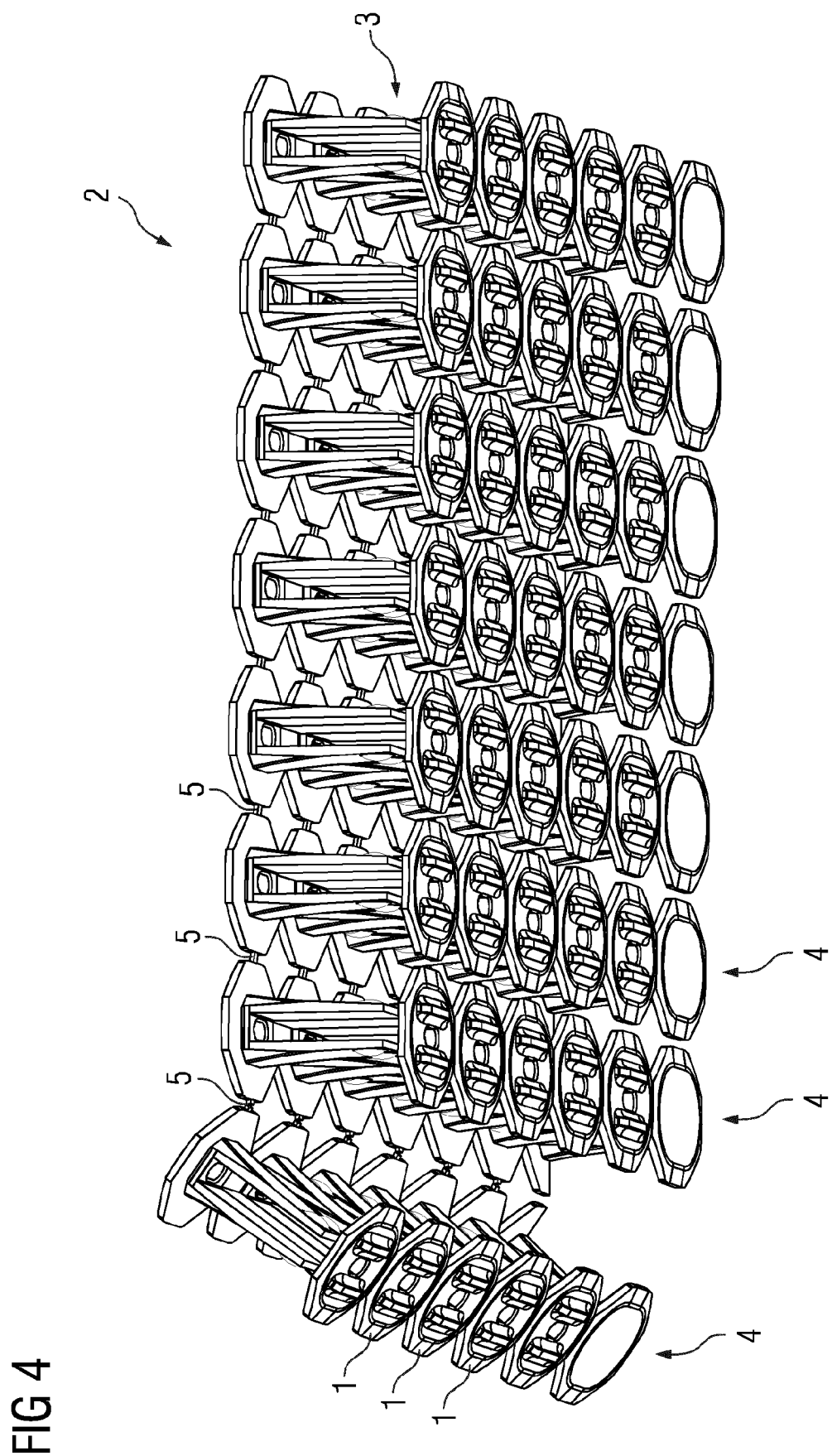
FIG. 4 shows a schematic drawing of the layer-wise arranged plurality of product as shown in FIG. 3, wherein a row of the products is going to be detached from the remaining layer-wise arranged plurality of products.

FIG. 4 shows a schematic drawing of the layer-wise arranged plurality of product 2 as shown in FIG. 3, wherein a row 4 of the products 1 is going to be detached from the remaining layer 3 of the plurality of products 2. Herein, the breakable connection 5 provided between the different rows 4 of the layer 3 of the plurality of products 2 is visible. Said breakable connection only provides a low strength connection at specific points and is weak enough to be broken apart by hand, while it still provides enough strength to keep the plurality of products together for taking it out of the 3D printing device as a whole.

The breakable connections located at the head parts of the products 1 located at the bottom of the row 4 on the left have already been broken apart. This allows to bend the row 4 on the left out of its original position, wherein the breakable connection 5 still connecting said row 4 to the remaining part of the layer 3 of the plurality of products is going to break any moment.

Figure 5:
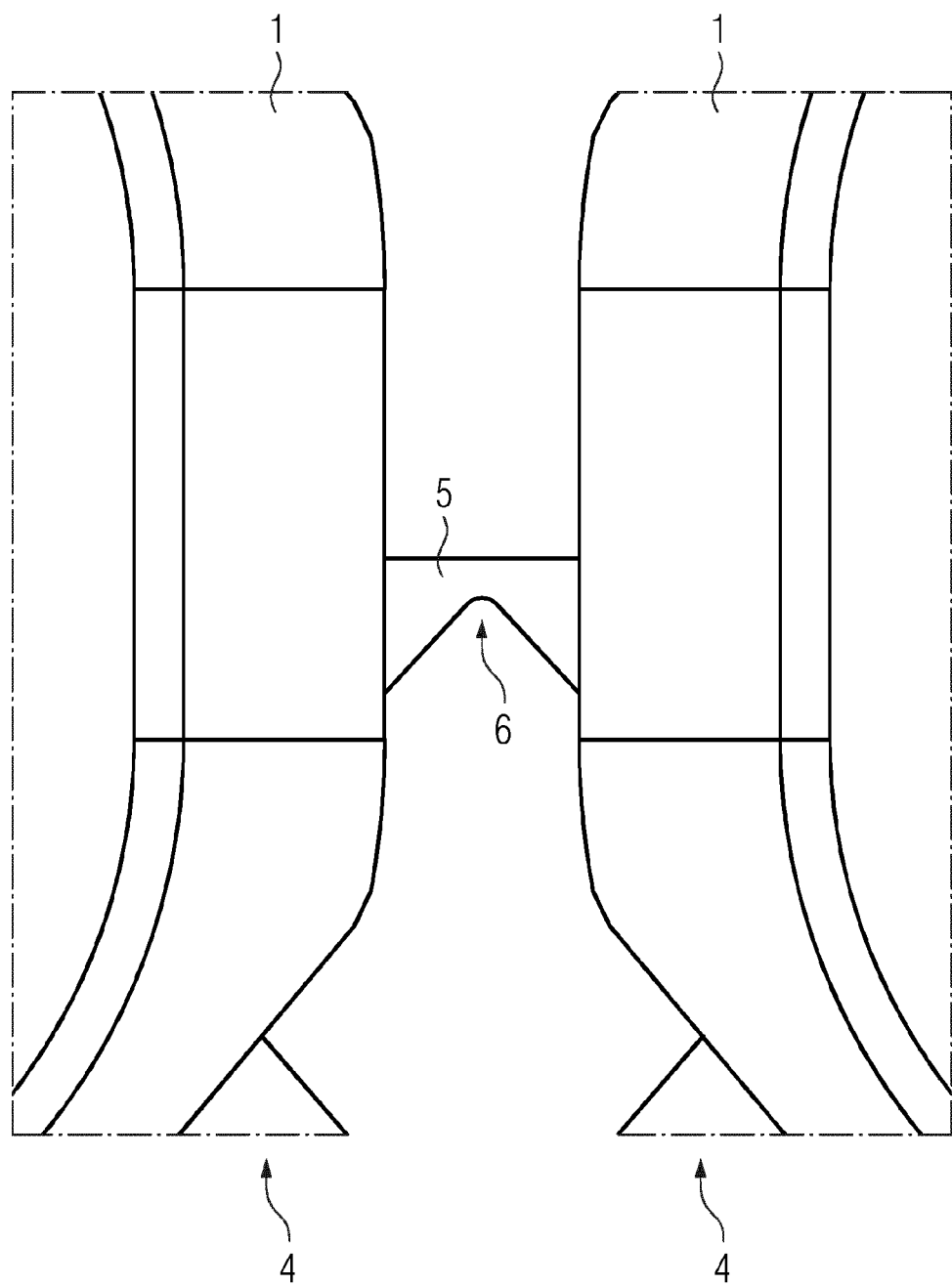
FIG. 5 shows a cutout of a schematic drawing of a breakable connection located between two rows of the products.

FIG. 5 shows a cutout of a schematic drawing of a breakable connection 5 located between two rows 4 of the products 1. The breakable connection 5 takes the form of a bridging element providing a necking area 6 located in the middle between the products 1. The bridging element provides a maximum thickness of 1 mm and a minimum thickness of 0.2 mm.

Figure 6:
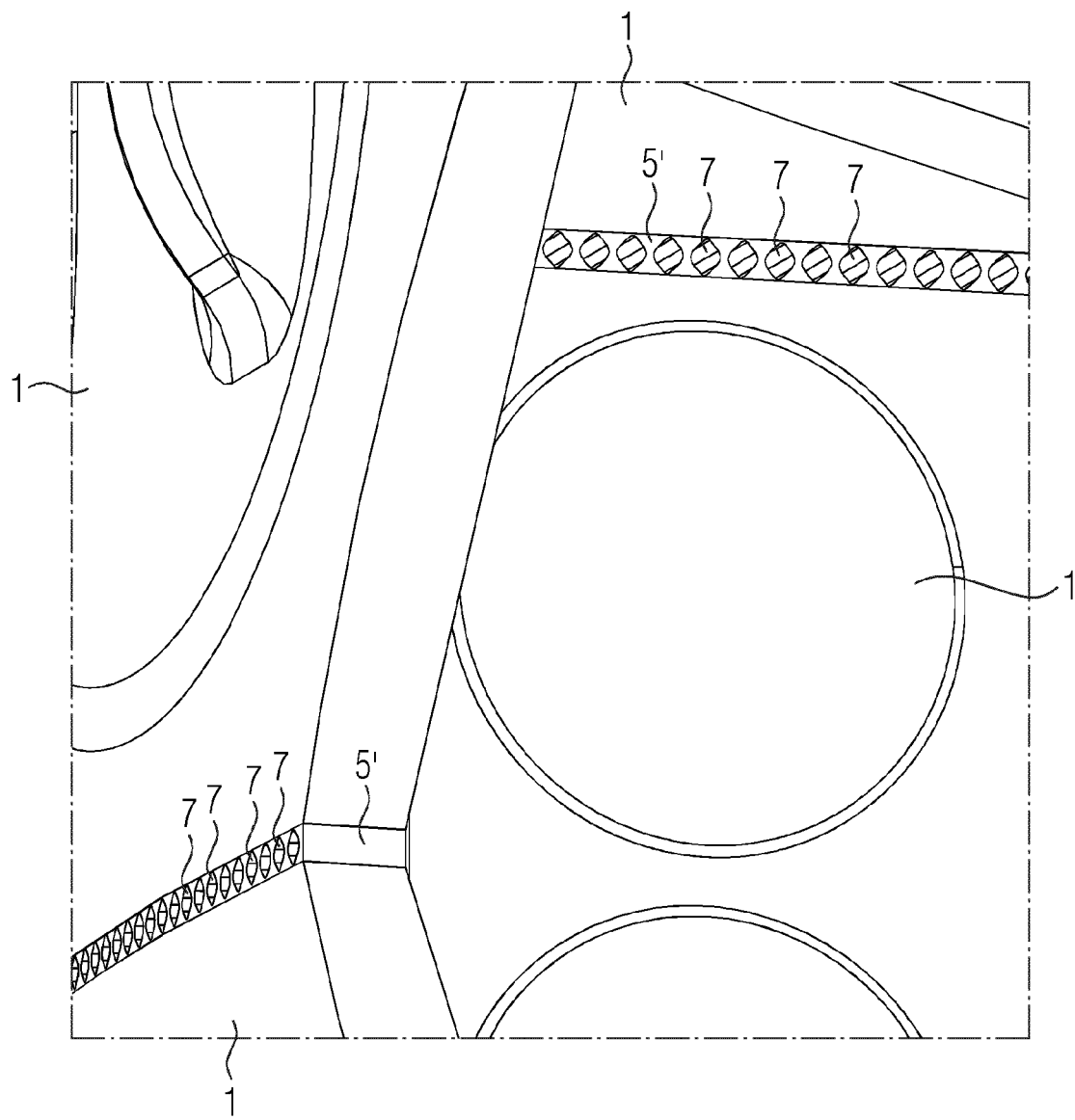
FIG. 6 shows a cutout of the schematic sideview of a row of the products showing to breakable connections located between neighboring products.

FIG. 6 shows a cutout of the schematic sideview of a row of the products 1 showing to breakable connections located between neighboring products 1 within a row 4. The breakable connection 5' takes the shape of a wall like structure containing holes 7 extending from one side of the wall to the other side. The breakable connection 5' connects the heads and flanks of the clamps to neighboring clamps. The wall like structure as shown in FIG. 6 provides a significantly higher stability compared to the single bridging elements as shown in FIGS. 4 and 5. However, it is still easily possible to manually detach the single products 1 by using an inventive tool.

Figure 7:
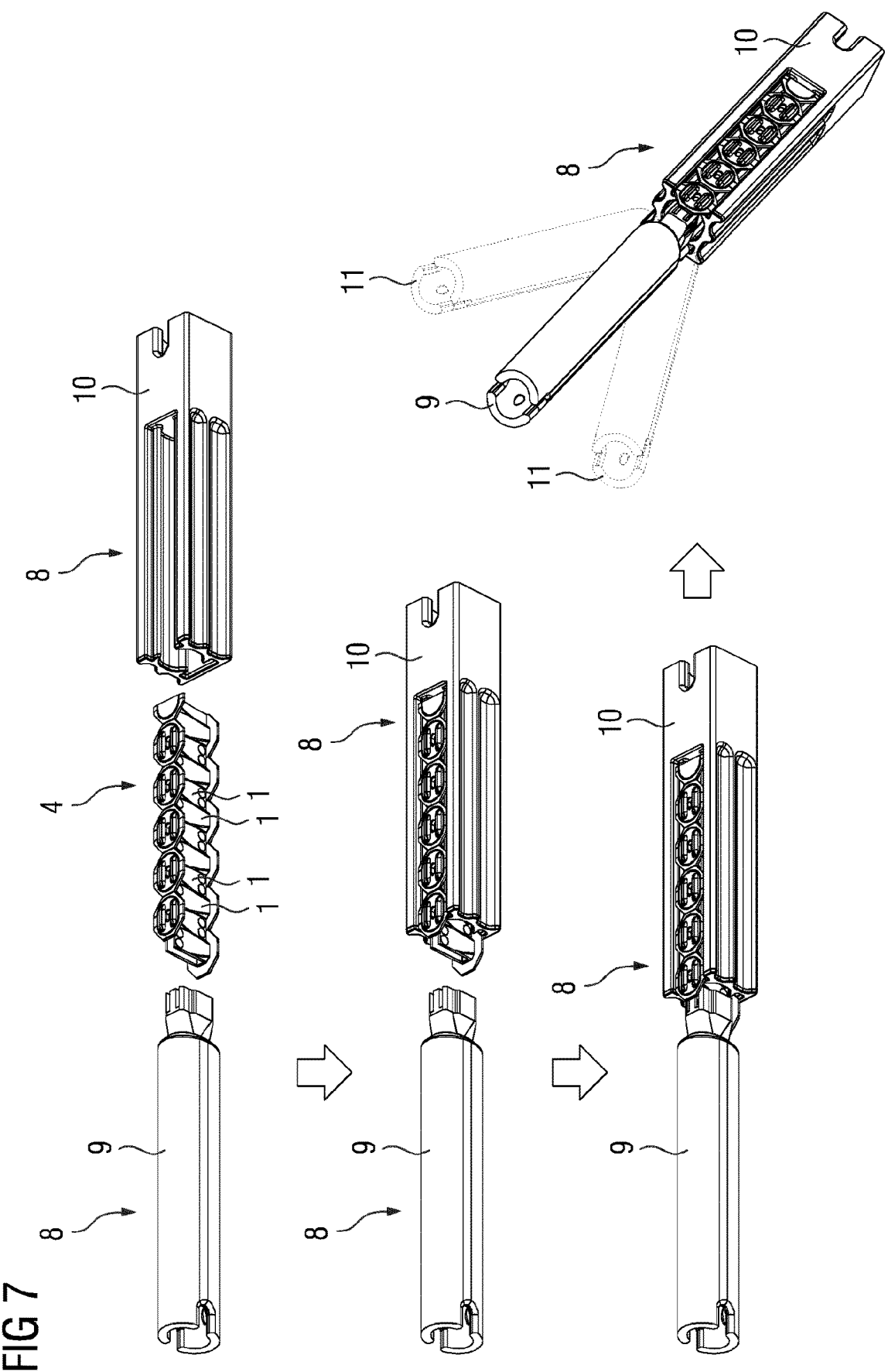
FIG. 7 shows a schematic scheme of detaching a single product of a row of products manually by utilizing an inventive tool.

FIG. 7 shows a schematic scheme of detaching a single product 1 of a row of products 1 manually by utilizing an inventive tool 8. Herein, the row 4 of the products 1 was detached from the layer of the plurality of products and is inserted in the second part 10 of the tool 8. The row 4 is inserted to a degree that the product 1 to be detached from the remaining part of the row 4 is outside the second part 10. Then the first part 9 of the tool 8 engages the product 1 to be detached.

Moving the first part 9 of the tool 8 in a downwards direction to the lower position 11 results in the breakable connection between the products 1 of the row 4 to break apart. Hereafter, the row 4 can be pulled out a bit of the second part 10 and the first part 9 is moved upwards to the upper position 11 to detach the next product 1. This process is repeated until the products 1 of the row 4 are detached from each other.

Surprisingly little force is required despite the overall stability of the row 4. The tool essentially makes use of the inhomogeneous force resulting from the rotational movement concentrating the tearing force at one end of the breakable connection. This allows to tear apart the breakable connection between the two neighboring products 1 with little force required. This also allows to provide a high safety as the detachment process is very easy to control and the operator handling the tool 8 can concentrate on preventing mistakes without being distracted from trying to provide enough force.

The hole containing wall like structure being the breakable connection 5' rips apart from hole to hole like a stamp making the overall breaking process very smooth further simplifying the manual detachment and increasing the reliability that the breaking is limited to the breakable connection 5'. While the first part 9 of the tool 8 applies force onto a side of the product 1 to be detached the second part 10 of the tool is utilized to provide a counter force onto the surface of multiple products 1 of the remaining part of the row 4.

Figure 8:
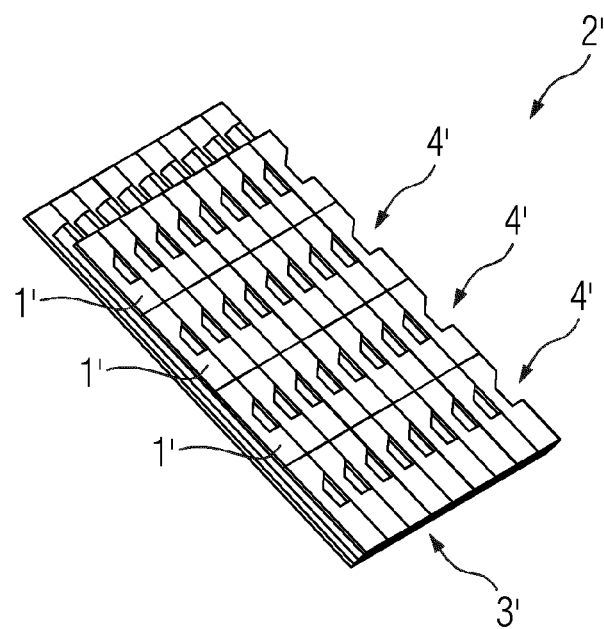
FIG. 8 shows a schematic sideview of a kit of a different product being a blade seal plate and a tool adapted to detach a single blade seal plate from the plurality of products.
Figure 8:
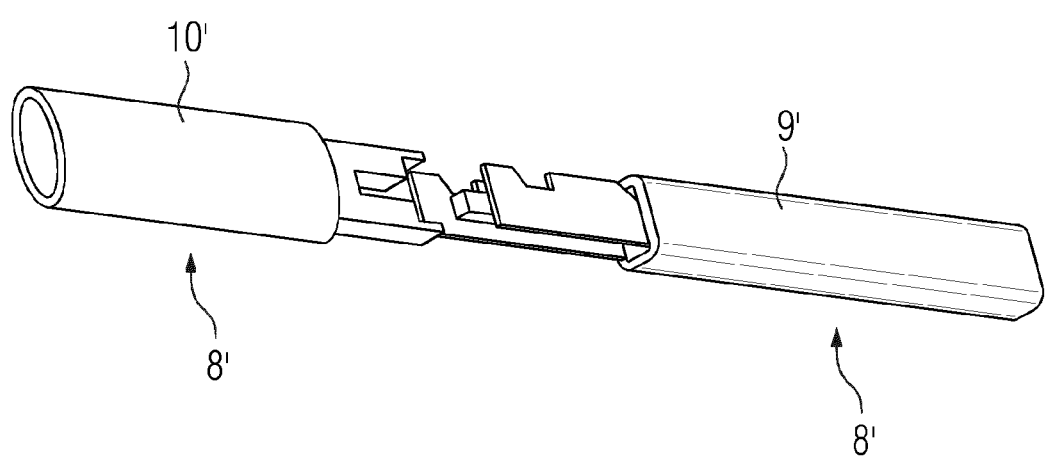

FIG. 8 shows a schematic sideview of a kit of a different product 1' being a blade seal plate and a tool 8' adapted to detach a single blade seal plate from the plurality of products 2'. Comparable to the embodiment as shown in FIGS. 1 and 3 to 7 a layer 3' of the plurality of products 2' is provided. However, contrary to the embodiment as shown above the arrangement of the products 1' takes the form of rows 4' being arranged side-by-side to provide the layer 3'. This simple arrangement can be efficiently realized based on the different shape of the product 1'.

Figure 9:
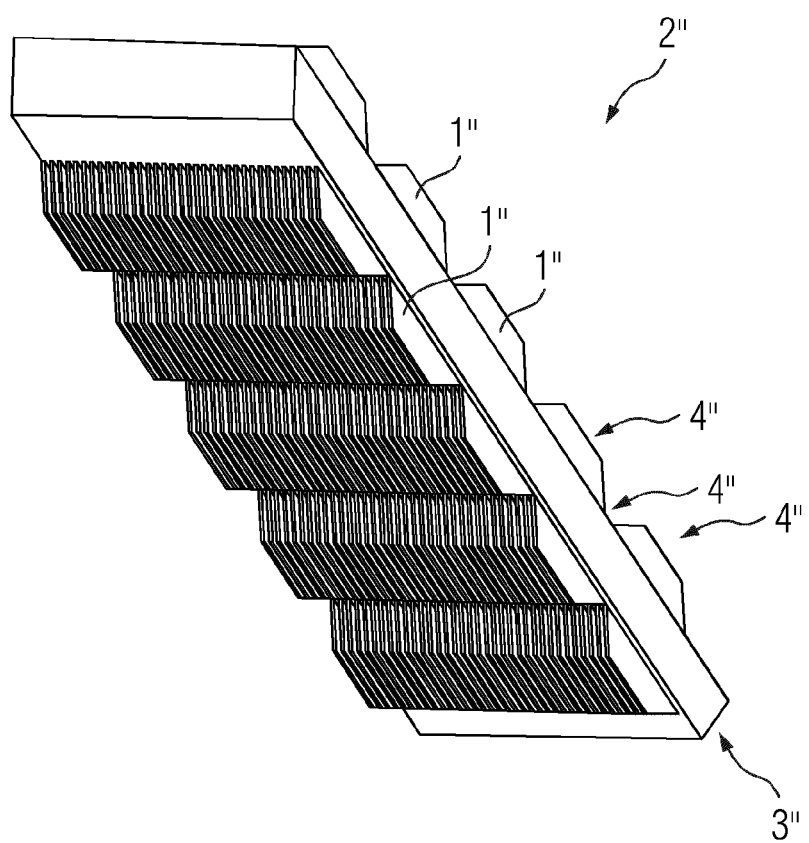
FIG. 9 shows a schematic sideview of a plurality of products of a different product being an orifice.

FIG. 9 shows a schematic sideview of a plurality of products 2" of a different product 1" being an orifice. Herein, the arrangement resembles the arrangement as shown in FIGS. 1 and 3 to 7. The products 1" are arranged in the form of rows 4". The rows 4" are again connected to each other in an alternating way to provide the layer 3" of the plurality of products 2".

The present invention was only described in further detail for explanatory purposes. However, the invention is not to be understood being limited to these embodiments as they represent embodiments providing additional benefits to solve specific problems or fulfilling specific needs. The scope of the protection should be understood to be only limited by the claims attached.

The invention claimed is:

1. A plurality of products manufactured using additive manufacturing comprising:
   a breakable connection, wherein at least 50% of the products of the plurality of products are connected by the breakable connection to at least one neighboring product of the plurality of products,
   wherein the breakable connection is adapted to be broken apart by a tool adapted to apply force on at least one side of at least two products,
   wherein at least 70% of the at least 50% of the breakable connections to at least one neighboring product comprise at least three bridging elements,
   wherein the bridging element extends between at least two neighboring products,
   wherein the bridging element provides a necking area between the neighboring products,
   wherein the bridging element provides an area in a cross-section perpendicular to a center line extending through the bridging element between the neighboring products,
   wherein the area in the necking area is at most 50% of a highest area of the bridging element,
   wherein the plurality of products is provided in a form of rows of products, and
   wherein the rows of the products are connected to provide a layer of products.

2. The plurality of products according to claim 1, wherein at least two of the products provide at least one breakable connection directly connecting the at least two neighboring products to each other.

3. The plurality of products according to claim 1, wherein at least 90 wt.-% of the products consist of a metal, metal alloy or ceramic.

4. The plurality of products according to claim 1, wherein the bridging element provides a maximum thickness measured perpendicular to the center line extending through the bridging element between the neighboring products, and
   wherein the maximum thickness is at most 0.5 mm.

5. The plurality of products according to claim 1, wherein the bridging element provides a maximum thickness measured perpendicular to the center line extending through the bridging element between the neighboring products, and
   wherein the maximum thickness at a location of the necking area is at most 0.2 mm.

6. The plurality of products according to claim 1, wherein the bridging element provides a maximum thickness and a minimum thickness in the cross-section perpendicular to the center line extending through the bridging element between the neighboring products, and
   wherein the minimum thickness is at most 45% of the maximum thickness.

7. The plurality of products according to claim 1, wherein the breakable connection further comprises a wall structure.

8. The plurality of products according to claim 7, wherein the wall structure comprises at least one indentation on at least one side and/or wherein the wall structure comprises at least one hole.

9. The plurality of products according to claim 1, wherein the number of products is at least 10.

10. A product manufactured by
    detaching the product from the plurality of products according to claim 1.

11. A method of manufacturing simultaneously the plurality of products according to claim 1, comprising:
    a) optionally redesigning at least one product to be adapted to allow stacking of the plurality of products,
    b) providing manufacturing instructions, wherein the breakable connection is provided between at least a part of the plurality of products,
    c) manufacturing the plurality of products using additive manufacturing.

12. A computer program product, stored on a non-transitory machine-readable storage medium, comprising:
    instructions operable to cause a computing entity to execute a method according to claim 11.

13. The plurality of products according to claim 1, wherein the additive manufacturing comprises 3D printing.

14. The method of manufacturing according to claim 11, wherein the additive manufacturing comprises 3D printing.

15. The plurality of products according to claim 7,
wherein adjacent products within a row are connected to each other via respective wall structures;
wherein adjacent rows are connected to each other via respective bridging elements; and
wherein between the adjacent rows the necking areas of the respective bridging elements are aligned to form an axis about which a row of the adjacent rows pivot when being broken apart.

16. The plurality of products according to claim 7,
wherein adjacent products within a row are connected to each other via two wall structures; and
wherein the two wall structures are oriented transverse to each other.

* * * * *